J. H. RICHARDSON & J. C. CALHOUN.
Tool-Handle.
No. 225,868.   Patented Mar. 23, 1880.
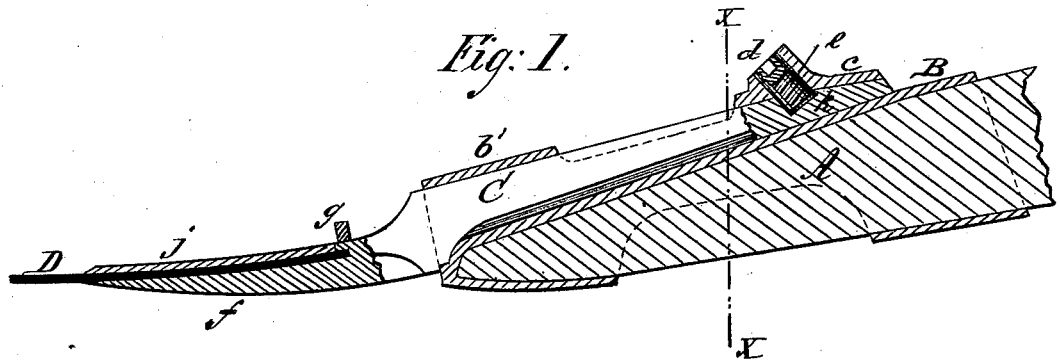
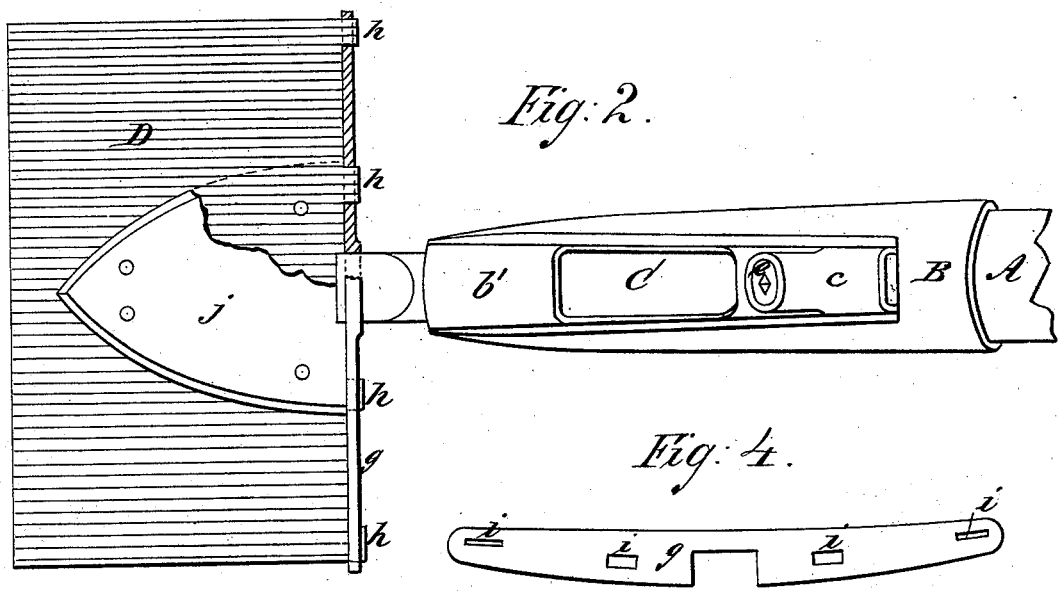
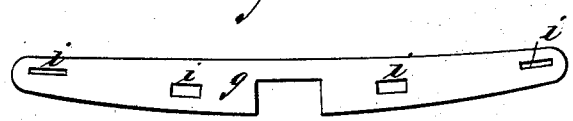
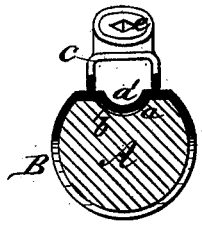
WITNESSES:
A. Schehl.
C. Sedgwick
INVENTOR:
J. H. Richardson
J. C. Calhoun
BY Munn & Co.
ATTORNEYS.

UNITED STATES PATENT OFFICE.

JACOB H. RICHARDSON AND JOHN C. CALHOUN, OF OAKLEY, LOUISIANA.

TOOL-HANDLE.

SPECIFICATION forming part of Letters Patent No. 225,868, dated March 23, 1880.

Application filed December 5, 1879.

*To all whom it may concern:*

Be it known that we, JACOB H. RICHARDSON and JOHN C. CALHOUN, of Oakley, in the parish of Franklin and State of Louisiana, have invented a new and Improved Tool-Handle, of which the following is a specification.

The invention is an improvement in the class of tool-sockets designed for application to wooden handles and adapted for holding tools of various kinds—for example, shovels, forks, spades, and other agricultural hand-implements.

In the accompanying drawings, Figure 1 is a longitudinal section of our improved handle with a shovel attached. Fig. 2 is a plan of the same. Fig. 3 is a cross-section of the handle taken on line $x\ x$ of Fig. 1, and Fig. 4 is a yoke or flange applied to the upper edge of the shovel to strengthen the said edge.

Similar letters of reference indicate corresponding parts.

Referring to the drawings, A is the lower end of a wooden handle, which is worked off to the shape of a wedge, and on its upper side is provided with a groove, $a$.

B is a metal socket or ferrule, which is adapted to be placed over the end A. In the upper side of ferrule B is a concave depression, forming an inward projection, $b$, of the surface of the ferrule, and on the outside a groove, $a'$, so that when the socket or ferrule is placed on the end A the projection $b$ enters the groove $a$ in the end A, and serves as a feather to prevent the socket or ferrule from turning. Over groove $a'$, at the lower end of the ferrule, is a keeper, $b'$, and at the upper end is a similar keeper, $c$, which is provided with a screw-threaded hole, $d$, for the reception of a screw-stud, $e$.

C is the shank of a shovel or spade, having attached to it a heart-shaped plate, $f$. At the junction of the shank with the plate is placed, at right angles to the shank, a flange, $g$.

D is the shovel-blade, placed on plate $f$, and with the projections $h$ on its upper edge entered into slots $i$ in yoke or flange $g$. On the upper side of shovel D is placed another heart-shaped plate, $j$. Plates $f\ j$ and shovel D are connected together by rivets. The shovel is attached to the end A of the handle by thrusting the shank C in the concave groove $a'$ under keepers $b'\ c$. Near the upper end of shank C, in the upper side, is a socket, $k$, which falls in line with the threaded hole $d$ when the shank is pushed up under the keepers $b'\ c$ as far as it will go, and when said socket is in line with the said hole the stud $e$ is screwed in until its end enters the socket $k$, whereby the said shank C and the tool which it carries are connected with the handle A.

The mode of connecting the tool and handle together can be applied to any tool which is provided with a shank similar to C, such as hoes, pitchforks, rakes, scythes, &c.

To detach the tool it is merely necessary to loosen the screw-stud $e$, so as to withdraw it from the socket $k$, when shank C will immediately drop out of groove $a'$ and from under keepers $b'\ c$.

Having thus described our invention, we claim as new and desire to secure by Letters Patent—

1. The ferrule B, constructed with the concave groove $a'$, keepers $b'\ c$, and stud $e$, and with a socket to receive the handle to which it is applied, substantially as described.

2. The combination of the shank C with the ferrule B, having keepers $b'\ c$, and provided with a socket to receive the handle on which it is to be used, and screw $e$, substantially as described.

JACOB HENRY RICHARDSON.
JOHN CALDWELL CALHOUN.

Witnesses:
W. P. POWER,
E. A. GILBERT.